United States Patent [19]

Starczewski et al.

[11] Patent Number: 4,795,625
[45] Date of Patent: Jan. 3, 1989

[54] METHOD OF MANUFACTURING BARIUM SULPHIDE

[75] Inventors: Marian Starczewski, Warsaw; Maria Switonska-Oskedra, Chorzów; Tadeusz Grzywaczewski, Tarnowskie Góry; Hubert Pisarski, Tarnowskie Góry; Stanislaw Gazda, Tarnowskie Góry; Genowefa Sybilska, Gliwice, all of Poland

[73] Assignee: Politechnika Slaska im. Wincentego Pstrowskiego, Poland

[21] Appl. No.: 59,954

[22] Filed: Jun. 9, 1987

[30] Foreign Application Priority Data

Jun. 23, 1986 [PL] Poland ................................ 260218

[51] Int. Cl.$^4$ ............................................. C01B 17/44
[52] U.S. Cl. ................................................... 423/566
[58] Field of Search .................... 75/21; 423/168, 170, 423/277, 554, 561 R, 566

[56] References Cited

U.S. PATENT DOCUMENTS

| | | | |
|---|---|---|---|
| 1,045,769 | 11/1912 | Bollo et al. | 423/566 |
| 1,648,870 | 11/1927 | Richardson | 423/566 |
| 1,667,423 | 4/1928 | Lichtenberger et al. | 423/566 |
| 1,685,772 | 10/1928 | Booge et al. | 423/566 |
| 2,163,388 | 6/1939 | Wuethrich | 423/168 |
| 2,935,377 | 5/1960 | Jones | 423/277 |
| 3,640,682 | 2/1972 | Smith et al. | 423/566 |
| 3,661,518 | 5/1972 | Orahood | 423/566 |
| 4,039,649 | 8/1977 | Alagy et al. | 423/566 |
| 4,704,136 | 11/1987 | Weston et al. | 423/566 |

FOREIGN PATENT DOCUMENTS

| | | | |
|---|---|---|---|
| 62202 | 5/1971 | Poland | 423/561 R |
| 134420 | 3/1986 | Poland | 423/561 R |
| 1063354 | 3/1967 | United Kingdom | 423/566 |

OTHER PUBLICATIONS

Bailar, et al., editors, "Comprehensive Inorganic Chemistry", 1973, pp. 641–642, Pergamon Press.
Stanislaw Leszczynski and Jan Siwicki; *Technology of Mineral Salts;* Panstwowe Wydawnictwa Techniczne, Warsaw 1954; pp. 250–251.

*Primary Examiner*—John Doll
*Assistant Examiner*—Wayne A. Langel

[57] ABSTRACT

The invention relates to a method of manufacturing barium sulphide from barites or barium sulphate. The method of manufacturing barium sulphide as per this present invention involves using finely divided calcium carbide for the reduction at a temperature above 873 K. It is preferred to use carbide mixed with coke. It is also preferred to use an addition of borax to carbide or carbide coke mixture.

3 Claims, No Drawings

METHOD OF MANUFACTURING BARIUM SULPHIDE

BACKGROUND OF THE INVENTION

The subject of this present invention is a method of manufacturing barium sulphide by reducing barite or barium sulphate.

Those skilled in the art know the method of manufacturing barium sulphide by reducing barite with a carbon reducer /coke breeze/ involving converting water-insoluble barium sulphate into soluble barium sulphide which is a semiproduct or intermediate for the manufacture of litophone and a number of other barium compounds.

The research carried out has shown compounds of silicon, iron and aluminium which form sparingly soluble compounds/silicates and ferrates/ to have adverse effect during the process of reducing barium sulphate.

The method known from Polish Patent Specification No. 62,202 for intensifying the process of reducing barites with coke breeze by addition of calcium chloride has not found industrial application due to a marked increase in the corrosiveness of process equipment. The coke breeze employed in this present reduction process contains about 12 per cent of an ash which contains silicon, iron, aluminum compounds exerting adverse effect on the barium sulphate reduction process.

THE INVENTION

It has unexpectedly turned out that the application of carbide to the process allows not only a higher reduction rate of barium sulfate to be attained and the process temperature to be lowered, but also the quality of the sinter is improved.

The method of manufacturing barium sulphide as per this present invention involves using finely divided carbide for the reduction of barites at a temperature above 873° K. It is preferred to use the carbide mixed with coke for the reduction.

It is also preferred to use an addition of borax as a fluxing agent to carbide or a mixture of borax, carbide and coke for the reduction. The borax as flux, enhances the reduction process and additionally segregates some of the common impurities, Si,Fe,Al, found in the barite.

In comparison with the known method of reducing barites with the application of coke at a temperature of 1573° K. for three hours, the barium sulphate reduction process as per this present invention with the application of carbide ensures a high degree of reduction within the limits of 98 per cent at a temperature of 1273° K. after 60 minutes of conducting the reduction process. The amount of CaO increased as a result of the decomposition of $CaC_2$ causes an appropriate amount of silica to be bound to calcium sulphate helping in markedly intensifying the reduction process.

EXAMPLE I 100 g of finely divided calcium carbide was added to 400g of flotation barite/7% $H_2O$/ /containing 95% $BaSO_4$, 2% $SiO_2$, 0.6% $Fe_2O_3$ and 0.5% $CaF_2$ in terms of dry mass/ as the main components. The reduction process was held for 60 minutes at a temperature of 1273° K. in a Sylite furnace.

On the basis of the analysis conducted, 90 per cent of barium sulphate was found to be reduced to barium sulphide.

EXAMPLE II 40 g of carbide and 60 g of coke breeze was added to 40 g of floatation barite of the composition mentioned in Example I. The process was held in a Sylite furnace at a temperature of 1323° K. for 60 minutes.

96% of barium sulphate was reduced to barium sulphide.

We claim:

1. A method of manufacturing barium sulfide by reducing barites or barium sulfate ores wherein finely divided calcium carbide is used as the reduction agent for said barites or barium sulfate ores by heating a mixture of said ores and said agent to a temperature above 873° K.

2. The method as per claim 1, wherein said calcium carbide is admixed with coke.

3. The method according to claims 1 or 2 wherein borax is added to the reduction mixture.

* * * * *